US008890459B2

(12) United States Patent
Sakai et al.

(10) Patent No.: US 8,890,459 B2
(45) Date of Patent: Nov. 18, 2014

(54) MOTOR CONTROL DEVICE AND ELECTRIC POWER STEERING SYSTEM

(75) Inventors: Atsuo Sakai, Okazaki (JP); Tsutomu Matsumoto, Anjo (JP); Kazushi Suzuki, Chiryu (JP)

(73) Assignee: JTEKT Corporation, Osaka-Shi (JP)

( * ) Notice: Subject to any disclaimer, the term of this patent is extended or adjusted under 35 U.S.C. 154(b) by 496 days.

(21) Appl. No.: 13/256,023

(22) PCT Filed: Mar. 10, 2010

(86) PCT No.: PCT/JP2010/001702
§ 371 (c)(1),
(2), (4) Date: Oct. 14, 2011

(87) PCT Pub. No.: WO2010/106764
PCT Pub. Date: Sep. 23, 2010

(65) Prior Publication Data
US 2012/0118662 A1 May 17, 2012

(30) Foreign Application Priority Data
Mar. 17, 2009 (JP) .................................. 2009-064970

(51) Int. Cl.
*G05B 11/28* (2006.01)
(52) U.S. Cl.
USPC .......................................... 318/599; 318/811
(58) Field of Classification Search
USPC ............ 318/599, 811, 400.02, 798, 800, 801; 363/41, 98
See application file for complete search history.

(56) References Cited

U.S. PATENT DOCUMENTS

| 4,576,253 A * | 3/1986 | Tanahashi et al. ............ 187/296 |
| 4,788,485 A | 11/1988 | Kawagishi et al. |
| 5,825,641 A | 10/1998 | Mangtani |
| 6,301,137 B1 | 10/2001 | Li |
| 7,017,377 B2 * | 3/2006 | Hosoito et al. ............... 68/12.16 |
| 7,042,741 B2 * | 5/2006 | Tanaka et al. .................... 363/41 |

(Continued)

FOREIGN PATENT DOCUMENTS

| JP | A-2002-345283 | 11/2002 |
| JP | A-2007-110788 | 4/2007 |

(Continued)

OTHER PUBLICATIONS

U.S. Appl. No. 12/828,417, filed Jul. 1, 2010 in the name of Satoru Mikamo et al.
International Search Report issued Jun. 22, 2010 in related Application No. PCT/JP2010/001702(with translation).
Aug. 21, 2012 Notice of Allowance issued in U.S. Appl. No. 12/828,417.

*Primary Examiner* — Rina Duda
(74) *Attorney, Agent, or Firm* — Oliff PLC

(57) ABSTRACT

A motor control device with which both high-accuracy current detection and improvement in voltage utilization factor are achieved is provided. When an ON time of any one of low potential side switching elements corresponding to respective phases in a driving circuit is shorter than a detection time of a current value, a microcomputer estimates a phase current value of a current undetectable phase based on current values of two phases other than the current undetectable phase corresponding to the said FET. Then, at the time of current detection using the blind correction, during current detection for two phases, other than the current undetectable phase, based on which the blind correction is performed, motor control signals for maintaining switching states of a switching arm corresponding to the current undetectable phase are output.

7 Claims, 8 Drawing Sheets

(56) References Cited

U.S. PATENT DOCUMENTS

| | | |
|---|---|---|
| 7,466,086 B2 * | 12/2008 | Kiuchi et al. ............... 318/41 |
| 7,483,279 B2 * | 1/2009 | Lee ............................. 363/41 |
| 7,583,523 B2 | 9/2009 | Goto |
| 7,737,648 B2 | 6/2010 | Nagase et al. |
| 7,898,210 B2 | 3/2011 | Hsieh et al. |
| 2008/0067960 A1 * | 3/2008 | Maeda et al. ........ 318/400.02 |
| 2011/0005855 A1 | 1/2011 | Mikamo et al. |

FOREIGN PATENT DOCUMENTS

| | | |
|---|---|---|
| JP | A-2007-110814 | 4/2007 |
| JP | A-2008-199712 | 8/2008 |
| JP | A-2009-001055 | 1/2009 |
| WO | WO 2010/106764 A1 | 9/2010 |

* cited by examiner

MOTOR CONTROL DEVICE AND ELECTRIC POWER STEERING SYSTEM

TECHNICAL FIELD

The invention relates to a motor control device and an electric power steering system.

BACKGROUND ART

In a motor control device used for an electric power steering system (EPS), or the like, a driving circuit (PWM inverter) that supplies driving electric power to a motor based on motor control signals is usually formed by connecting pairs of serially connected switching elements (switching arms), in correspondence with respective phases, in parallel with one another. Some of such motor control devices have current sensors at the low potential sides (grounding sides) of the switching arms that constitute the driving circuit. For example, see Patent Document 1.

In usage where smooth motor rotation and high quietness are required, like in an EPS, driving electric power is generally supplied to the motor by sinusoidal wave conduction; however, feedback of current values of the respective phases is indispensable for that supply. Therefore, the current sensors for current detection of the respective phases are provided at the driving circuit that is a driving electric power output unit.

In such a motor control device, current values of the respective phases are detected by the current sensors provided at the low potential side of the driving circuit at the timing at which all the low potential side switching elements that constitute the driving circuit are turned ON.

Specifically, as shown in FIG. 9, motor control signals are usually generated based on a comparison between duty command values (Du, Dv, Dw) of the respective phases, computed by executing current feedback control, and triangular waves ($\delta 1$, $\delta 2$). Note that, in this example, at the time of ON/OFF of each of the switching elements that constitute the driving circuit, in order to set a dead time for preventing a short circuit (arm short circuit) between the high potential side switching element and the low potential side switching element in each switching arm, vertically shifted two triangular waves $\delta 1$ and $\delta 2$ ($\delta 1 > \delta 2$) are used.

That is, when the duty command value Du, Dv or Dw is higher than the value of the triangular wave $\delta 1$, a motor control signal for turning on the high potential side switching element corresponding to that phase is generated; whereas when the duty command value Du, Dv or Dw is lower than the value of the triangular wave $\delta 2$, a motor control signal for turning on the low potential side switching element corresponding to that phase is generated. Then, a current value of each phase is detected at the timing at which the triangular wave $\delta 1$ or $\delta 2$ used to generate the motor control signal reaches a "peak".

However, although current detection is performed at the timing at which all the low potential side switching elements are turned ON as described above, current detection requires a certain period of time. Thus, at the time of an increased duty command value Du, Dv or Dw, the ON time t0 of the low potential side switching element corresponding to that phase becomes shorter than the detection time ts of a current value of that phase, so there occurs a case where the current detection cannot be performed. Therefore, in existing art, in order to ensure the detection time ts of a current value of that phase, in consideration of the detection time ts, for example, the dead time td for turning off both switching elements in order to prevent the arm short circuit is added to the detection time ts as a margin to set a high limit value Dmax for the duty command values Du, Dv and Dw of the respective phases.

RELATED ART DOCUMENT

Patent Document

Patent Document 1: Japanese Patent Application Publication No. 2009-1055

DISCLOSURE OF THE INVENTION

Problems to be Solved by the Invention

Incidentally, when the high limit value Dmax is set for the duty command values Du, Dv and Dw in this way, the voltage utilization factor decreases. For example, where the detection time ts of a phase current value is about 4 μs and is about 8% on a duty basis and the dead time td is about 1 μs and is about 2% on a duty basis, the high limit value Dmax is about 90% (100%−8%−2%=90%), so only about 90% of the voltage that can be output from the driving circuit may be used.

As a method for taking measures against a decrease in voltage utilization factor, a blind correction method in which the fact that the sum of phase current values of the respective phases becomes zero is utilized to estimate a phase current value of a current undetectable phase based on phase current values of two phases other than the current undetectable phase that occurs because the ON period t0 of the low potential side switching element becomes shorter than the detection time ts of a current value as described above.

However, in the case where a current undetectable phase occurs in this way, even when only phase current values of two phases other than the current undetectable phase are detected, the switching elements in the current undetectable phase are turned on or off and, therefore, the noise is contained in the phase current values of the remaining current detectable two phases, causing a decrease in accuracy of current detection by blind correction.

The invention is made in order to solve the above problems, and one of the objects of the invention is to provide a motor control device and an electric power steering system with which both high-accuracy current detection and improvement in voltage utilization factor are achieved.

Means for Solving the Problems

A motor control device according to an aspect of the invention includes: control signal output device that outputs motor control signals; and a driving circuit that outputs three-phase driving electric power based on the motor control signals, wherein the driving circuit is formed by connecting switching arms, formed by serially connecting pairs of switching elements that are turned on or off based on the motor control signals, in correspondence with respective phases, in parallel with one another, the switching arms respectively have current sensors for detecting phase current values of the respective phases corresponding to the switching arms at low potential sides thereof, the control signal output device generates the motor control signals based on phase current values of the respective phases, detected at a timing at which all low potential side switching elements of the respective switching arms are turned ON, when an ON time of any one of the low potential side switching elements is shorter than a detection time of the current value, the control signal output device estimates a phase current value of a current undetectable phase based on phase current values of two phases other than the current undetectable phase corresponding to the said switching element, and at the time of current detection of the two phases, the motor control signals for maintaining switching states of the switching arm corresponding to the current undetectable phase are output.

That is, even when there occurs a current undetectable phase for which current detection cannot be performed by the current sensors provided at the low potential sides of the respective switching arms, it is possible to estimate a phase current value of the current undetectable phase based on phase current values of the remaining two phases other than the current undetectable phase. Then, when phase current values of two phases other than the current undetectable phase are detected, the switching states of the switching arm corresponding to the current undetectable phase are maintained, that is, the high potential side switching element is kept ON and the low potential side switching element is kept OFF, to thereby make it possible to prevent noise that arises from the switching from being contained. Thus, with the above configuration, even when output voltage limitations set for ensuring detection times of phase current values of all the phases (U, V, W) are removed, high-accuracy current detection may be ensured. As a result, it is possible to improve the voltage utilization factor.

Furthermore, in the motor control device according to the present aspect, the control signal output device executes current feedback control based on detected phase current values of the respective phases to thereby compute voltage command values of the respective phases, the control signal output device generates the motor control signals based on a comparison between duty command values corresponding to the respective voltage command values and a triangular wave, and, the motor control signals for maintaining switching states of the switching aim corresponding to the current undetectable phase are output by shifting the duty command values of the respective phases toward a high potential side such that the duty command value of the current undetectable phase becomes a value at which the high potential side switching element corresponding to the current undetectable phase is kept ON.

With the above configuration, in the switching arm corresponding to the current undetectable phase, the high potential side switching element is kept ON, and the low potential side switching element is kept OFF. In the execution range of current detection compensation control, the output voltages of the respective phases shift toward a high potential side. That is, by shifting the neutral point, the line-to-line voltage waveforms of the respective phases are constant irrespective of whether the current detection compensation control is executed. As a result, it is possible to achieve high-accuracy current detection without exerting an influence on smooth rotation of the motor.

Furthermore, another aspect of the invention is an electric power steering system that includes the motor control device according to the above aspect. With the above configuration, it is possible to attempt to reduce the size of the device using an increase in motor output through improvement in voltage utilization factor.

Effects of the Invention

According to the above aspects, it is possible to provide a motor control device and an electric power steering system with which both high-accuracy current detection and improvement in voltage utilization factor are achieved.

MODES FOR CARRYING OUT THE INVENTION

Hereinafter, one specific embodiment of the invention will be described with reference to the drawings.

Figure 1:
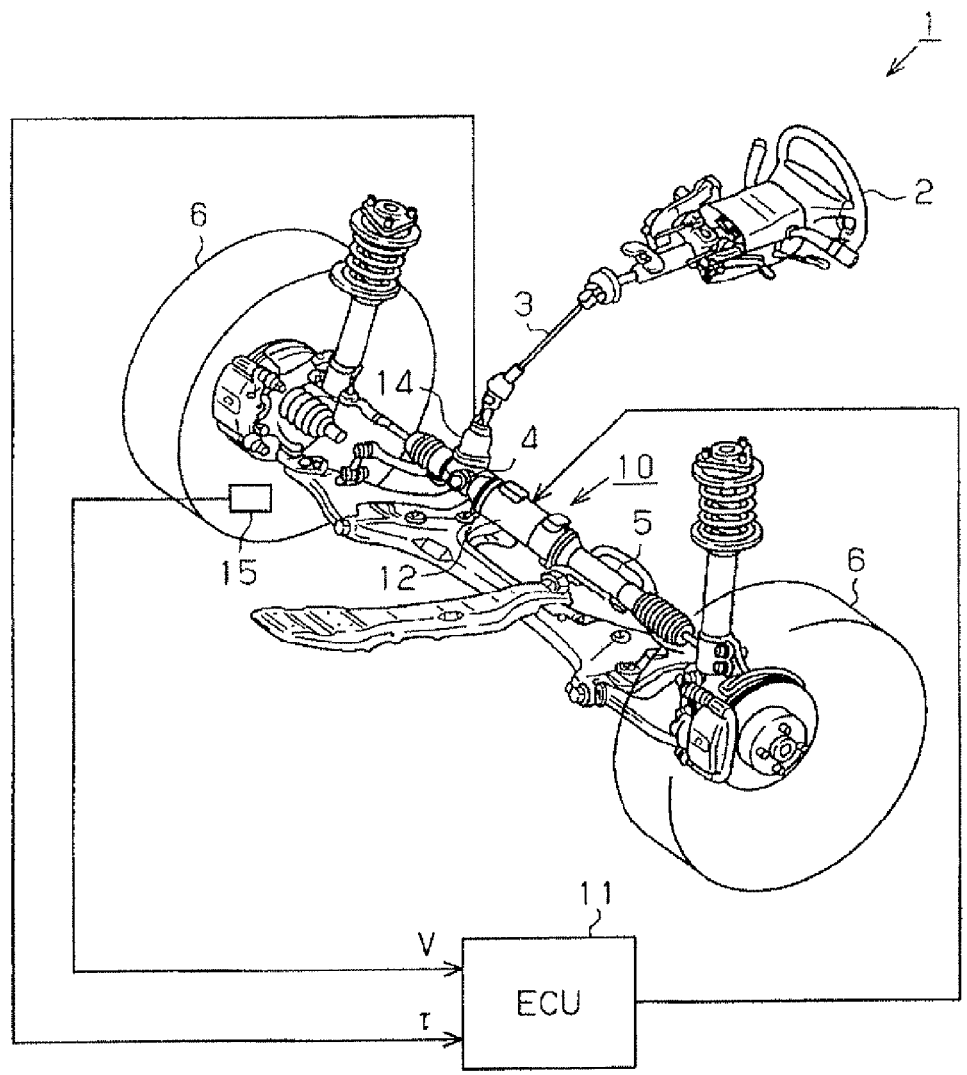
FIG. 1 is a schematic configuration diagram of an electric power steering system.

FIG. 1 is a schematic configuration diagram of an EPS 1 according to the present embodiment. As shown in the drawing, a steering shaft 3 to which a steering wheel 2 is fixed is coupled to a rack 5 via a rack-and-pinion mechanism 4, and rotation of the steering shaft 3 resulting from steering operation is converted to reciprocating linear motion of the rack 5 by the rack-and-pinion mechanism 4. Then, the steering angle of steered wheels 6 is changed by the reciprocal linear motion of the rack 5.

The EPS 1 includes an EPS actuator 10 and an ECU 11. The EPS actuator 10 applies assist force for assisting steering operation. The ECU 11 controls operation of the EPS actuator 10.

The EPS actuator 10 is a rack-type EPS actuator in which a motor 12 that serves as a driving source is arranged coaxially with the rack 5, and assist torque generated by the motor 12 is transmitted to the rack 5 via a ball screw mechanism (not shown). Note that the motor 12 according to the present embodiment is a brushless motor, and rotates on three-phase (U, V and W) driving electric power supplied from the ECU 11. Then, the ECU 11 controls assist torque generated by the motor 12 to control assist force applied to a steering system.

A torque sensor 14 and a vehicle speed sensor 15 are connected to the ECU 11. The ECU 11 executes assist control based on a steering torque τ and a vehicle speed V respectively detected by these torque sensor 14 and vehicle speed sensor 15.

Next, the electrical configuration of the EPS according to the present embodiment will be described.

Figure 2:
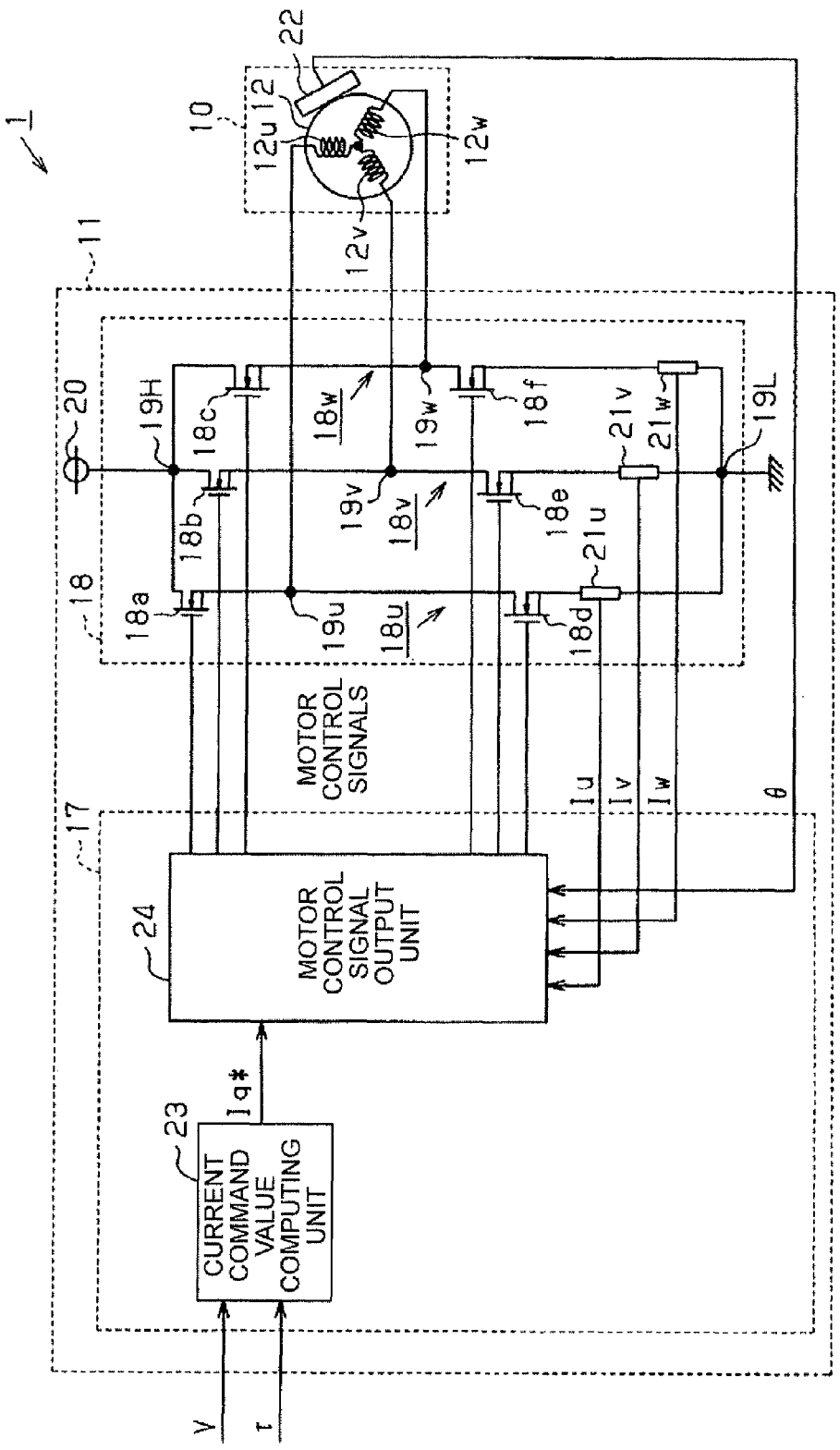
FIG. 2 is a block diagram that shows the electrical configuration of the EPS.

FIG. 2 is a control block diagram of the EPS according to the present embodiment. As shown in the drawing, the ECU 11 includes a microcomputer 17 and a driving circuit 18. The microcomputer 17 serves as motor control signal output device that outputs motor control signals. The driving circuit 18 supplies three-phase driving electric power to the motor 12 based on the motor control signals output from the microcomputer 17.

The driving circuit 18 is formed by connecting a plurality of FETs 18a to 18f that serve as switching elements. Specifically, the driving circuit 18 is formed by connecting series circuits of pairs of the FETs 18a and 18d, FETs 18b and 18e and FETs 18c and 18f in parallel with one another, and connection points 19u, 19v and 19w of the FETs 18a and 18d, FETs 18b and 18e and FETs 18c and 18f are respectively connected to motor coils 12u, 12v and 12w of the respective phases of the motor 12.

The driving circuit 18 is configured as a known PWM inverter that is formed by using a pair of serially connected switching elements as a base unit (switching arm) and then connecting three switching arms 18u, 18v and 18w corresponding to the respective phases in parallel with one another. The motor control signals output from the microcomputer 17 are gate ON/OFF signals that define the switching states of the respective FETs 18a to 18f that constitute the driving circuit 18.

The FETs 18a to 18f are turned on or off in response to the motor control signals applied to the respective gate terminals to change the pattern of conduction to the motor coils 12u, 12v and 12w of the respective phases. Thus, direct-current voltage of an in-vehicle power supply (battery) 20 is converted to three-phase (U, V and W) driving electric power, and the three-phase driving electric power is output to the motor 12.

The ECU 11 is provided with current sensors 21u, 21v and 21w for detecting current values Iu, Iv and Iw of the respective phases, supplied to the motor 12. In the present embodiment, the current sensors 21u, 21v and 21w are respectively provided at the low potential sides (ground sides, lower sides in FIG. 2) of the pairs of FETs 18a and 18d, FETs 18b and 18e and FETs 18c and 18f in the driving circuit 18.

Figure 9:
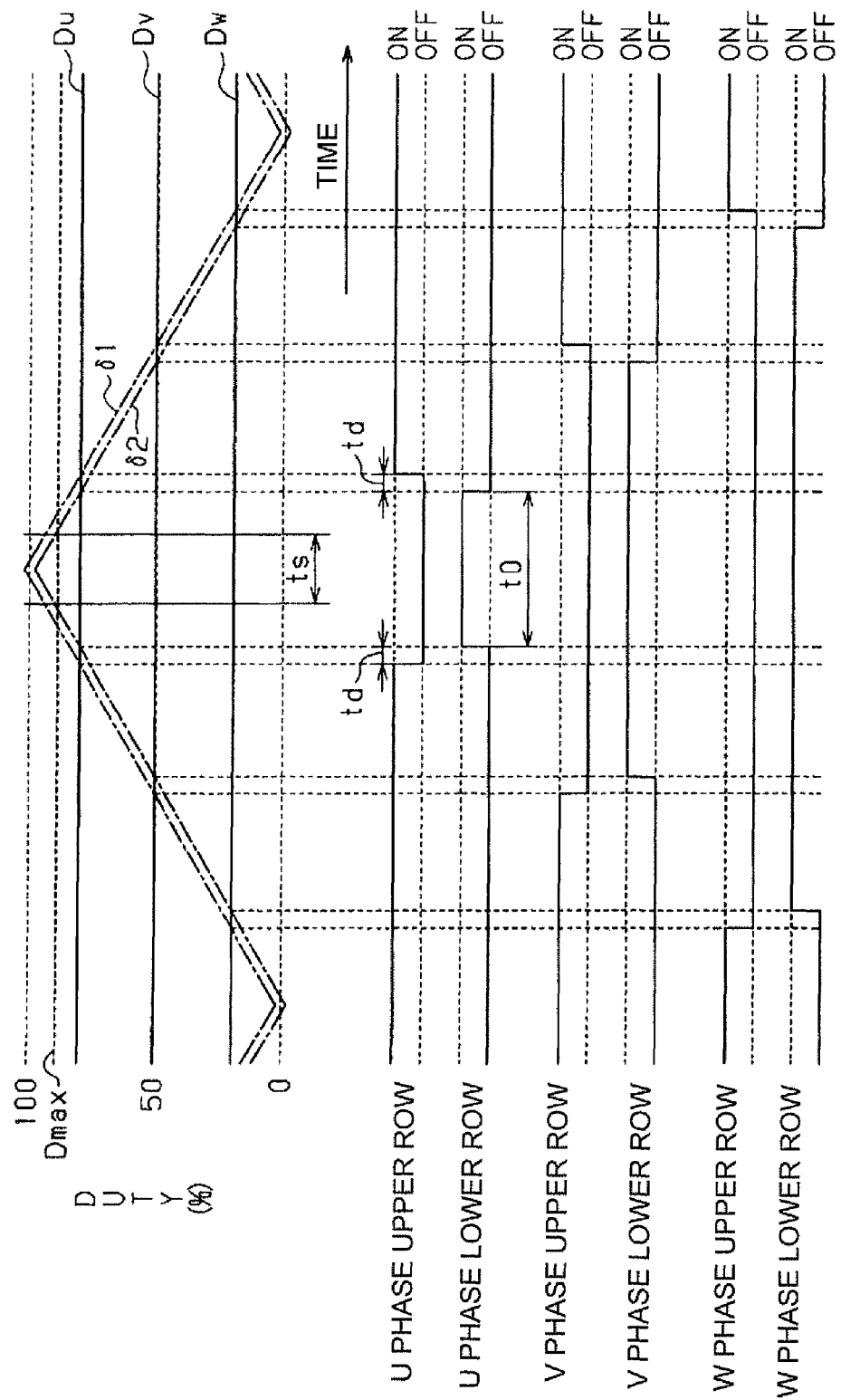
FIG. 9 is a view that shows a mode of current detection.

Each of the current sensors 21u, 21v and 21w has a known configuration for performing current detection based on the voltage between the terminals of a resistor (shunt resistor) connected in series with a circuit. Specifically, the resistors are connected in series with the circuit between the ground side FETs 18d, 18e and 18f and a ground side connection point 19L out of connection points 19H and 19L that connect the pairs of switching elements corresponding to the respective phases, that is, the pairs of FETs 18a and 18d, FETs 18b and 18e and FETs 18c and 18f, in parallel with one another. Then, the microcomputer 17 detects current values Iu, Iv and Iw of the respective phases based on signals output from the current sensors 21u, 21v and 21w at a predetermined sampling interval, more specifically, at the timing at which all the low potential side FETs 18d, 18e and 18f are turned ON, that is, at the timing at which triangular waves 61 and 82 used to generate motor control signals reach a "peak" (see FIG. 9).

Together with these current values Iu, Iv and Iw of the respective phases, the steering torque τ and the vehicle speed V respectively detected by the torque sensor 14 and the vehicle speed sensor 15 and the rotation angle (electrical angle) θ of the motor 12, detected by a rotation angle sensor 22 provided at the motor 12, are input in the microcomputer 17. Then, the microcomputer 17 outputs motor control signals to the driving circuit 18 based on these current values Iu, Iv and Iw of the respective phases, rotation angle θ, steering torque τ and vehicle speed V.

More specifically, the microcomputer 17 determines target assist force to be applied to the steering system based on the steering torque τ and the vehicle speed V, and generates the motor control signals by executing current control based on the detected current values Iu, Iv and Iw of the respective phases and the detected rotation angle θ in order to cause the motor 12 to generate the assist force.

The microcomputer 17 includes a current command value computing unit 23 and a motor control signal output unit 24. The current command value computing unit 23 computes assist force applied to the steering system, that is, a current command value as a control target value of motor torque. The motor control signal output unit 24 serves as control signal output device that outputs motor control signals to the driving circuit 18 based on the current command value calculated by the current command value computing unit 23.

The current command value computing unit 23 computes target assist force to be generated by the EPS actuator 10 based on the steering torque τ and vehicle speed V detected by the torque sensor 14 and the vehicle speed sensor 15, and computes a current command value (Iq*) as a control target value of motor torque corresponding to that. The current command value computing unit 23 computes target assist force such that the target assist force increases as the input steering torque τ increases or as the vehicle speed V decreases. Then, the current command value computing unit 23 outputs a current command value corresponding to the target assist force to the motor control signal output unit 24.

On the other hand, together with the current command value output from the current command value computing unit 23, the current values Iu, Iv and Iw of the respective phases and the rotation angle θ of the motor 12 are input in the motor control signal output unit 24. Here, the current command value computing unit 23 outputs a q-axis current command value Iq* to the motor control signal output unit 24 as the current command value. Then, the motor control signal output unit 24 executes current feedback control on the d/q coordinate system based on these current values Iu, Iv and Iw of the respective phases and the rotation angle θ (electrical angle) to thereby generate motor control signals.

Figure 3:
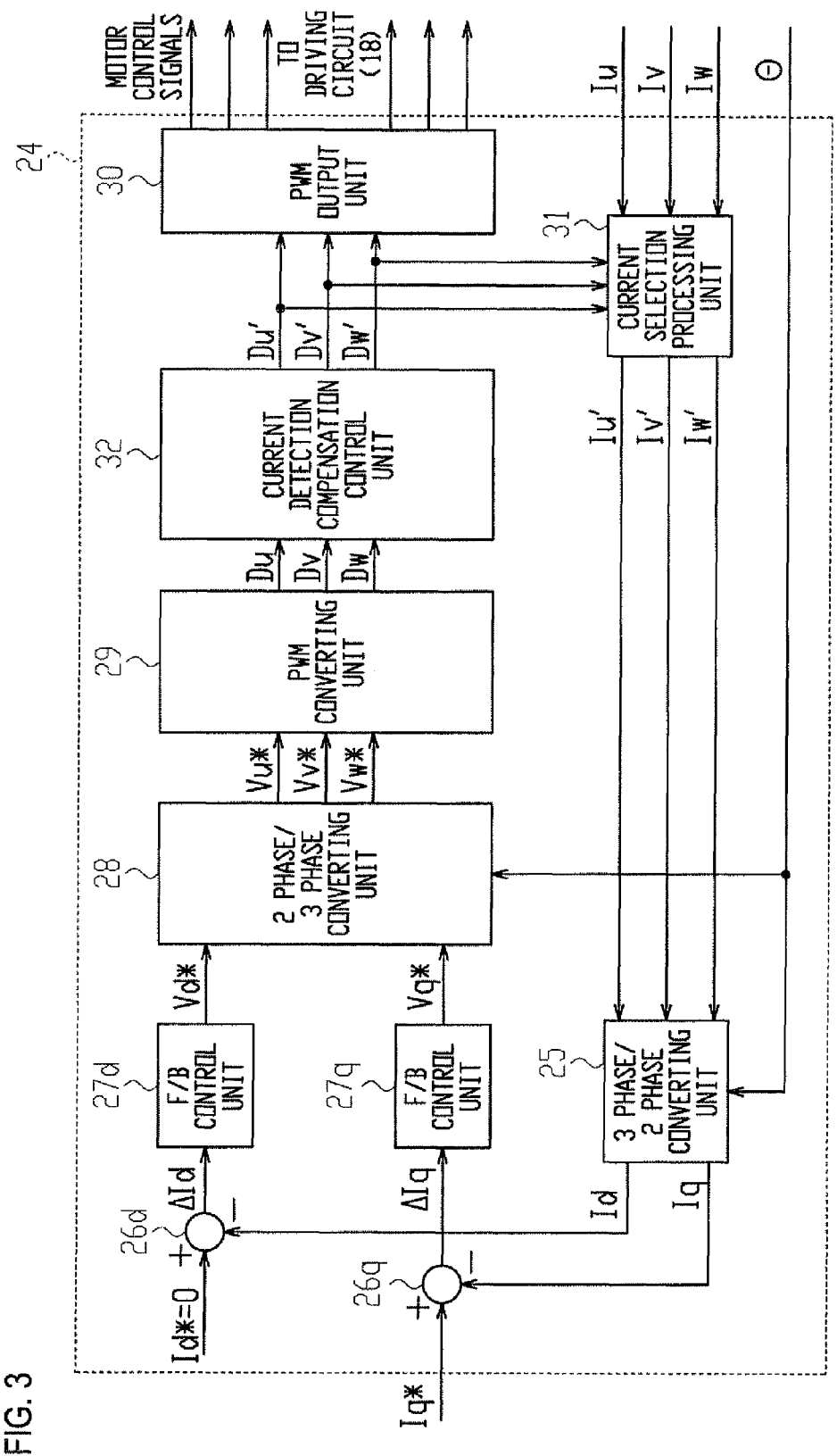
FIG. 3 is a block diagram that shows the schematic configuration of a motor control signal output unit.

More specifically, as shown in FIG. 3, the current values Iu, Iv and Iw of the respective phases, input in the motor control signal output unit 24, are input in a three phase/two phase converting unit 25 via a current selection processing unit 31 (described later) and is converted to a d-axis current value Id and a q-axis current value Iq on the d/q coordinate system based on the rotation angle θ of the motor 12 by the three phase/two phase converting unit 25. Then, the q-axis current value Iq is input in a subtracter 26q together with the q-axis current command value Iq* input from the current command value computing unit 23, and the d-axis current value Id is input in a subtracter 26d together with the d-axis current command value Id* (Id*=0).

A d-axis current deviation ΔId and a q-axis current deviation ΔIq computed by the respective subtracters 26d and 26q are respectively input in corresponding F/B control units 27d and 27q. In these F/B control units 27d and 27q, feedback control is executed in order to cause the d-axis current value Id and the q-axis current value Iq, which are actual current values, to follow the d-axis current command value Id* and the q-axis current command value Iq* output from the current command value computing unit 23.

The F/B control units 27d and 27q respectively multiply the input d-axis current deviation ΔId and the input q-axis current deviation ΔIq by a predetermined F/B gain (PI gain) to compute a d-axis voltage command value Vd* and a q-axis voltage command value Vq*. Then, the computed d-axis voltage command value Vd* and q-axis voltage command value Vq* are input in a two phase/three phase converting unit 28 together with the rotation angle θ to compute three-phase voltage command values Vu*, Vv* and Vw* by the two phase/three phase converting unit 28.

Subsequently, these phase voltage command values Vu*, Vv* and Vw* are input in a PWM converting unit 29, and duty command values Du, Dv and Dw based on the respective phase voltage command values Vu*, Vv* and Vw* are generated by the PWM converting unit 29. In the present embodiment, these duty command values Du, Dv and Dw are input in the PWM output unit 30 via a current detection compensation control unit 32 (described later). Then, the motor control signal output unit 24 generates gate ON/OFF signals computed by the PWM output unit 30 based on a comparison between these duty command values Du, Dv and Dw (Du', Dv' and Dw') and the triangular waves δ1 and δ2 (see FIG. 9), that is, signals that define the switching states (ON/OFF operations) of the respective FETs 18a to 18f, and outputs the signals as motor control signals.

The microcomputer 17 is configured to output the motor control signals, output from the motor control signal output unit 24, to the gate terminals of the respective switching elements that constitute the driving circuit 18 to thereby control operation of the motor 12 through supply of driving electric power to the motor 12.

(Current Detection Compensation Control)

Next, a mode of current detection compensation control in the present embodiment will be described. The microcomputer 17 detects current values Iu, Iv and Iw of the respective phases at the timing at which all the low potential side FETs 18d, 18e and 18f in the respective switching arms 18u, 18v and 18w that constitute the driving circuit 18 are turned ON. However, in this case, if no high limit value Dmax is set for the duty command values Du, Dv and Dw, at the time of an increased duty command value Du, Dv or Dw, the ON time t0 of the low potential side FET corresponding to that phase becomes shorter than the detection time ts of that phase current value and, therefore, there occurs a case where it is impossible to perform current detection of that phase (see FIG. 4, in this example, at the time of Du>Dmax).

Then, when the ON time t0 of any one of the low potential side FETs 18d, 18e and 18f corresponding to the respective phases becomes shorter than the detection time ts of a current value, the microcomputer 17 estimates the phase current value of a current undetectable phase based on phase current values of two phases other than the current undetectable phase corresponding to that FET. This estimation of a phase current is called blind correction.

More specifically, as shown in FIG. 3, the motor control signal output unit 24 includes the current selection processing unit 31, and current values Iu, Iv and Iw (Iu', Iv' and Iw') of the respective phases, input in the motor control signal output unit 24, are input in the three phase/two phase converting unit 25 via the current selection processing unit 31. In addition, the duty command values Du, Dv and Dw (Du', Dv', Dw') of the respective phases corresponding to the phase voltage command values Vu*, Vv* and Vw* computed by executing current feedback control are input in the current selection processing unit 31. Then, when the value of any one of the input duty command values Du, Dv and Dw of the respective phases indicates that the detection time ts of the current value is shorter than the ON time t0 of the low potential side FET corresponding to that phase, the current selection processing unit 31 executes the blind correction, and outputs the computed current values Iu', Iv' and Iw' of the respective phases to the three phase/two phase converting unit 25.

The current selection processing unit 31 compares the input duty command values Du, Dv and Dw of the respective phases with a threshold Dth corresponding to the value of a high limit value Dmax in the case where it is assumed that the high limit value Dmax is set for the duty command values Du, Dv and Dw. The value of the high limit value Dmax in this case is a value that is determined in consideration of the detection time ts of a current value as described above (see FIG. 9, for example, a value corresponding to a time that is obtained by adding the dead time td, during which both switching elements are turned off in order to prevent the arm short circuit, as a margin to the detection time ts). Then, the current selection processing unit 31 executes the blind correction based on a comparison between the threshold Dth and each of the duty command values Du, Dv and Dw.

Figure 5:
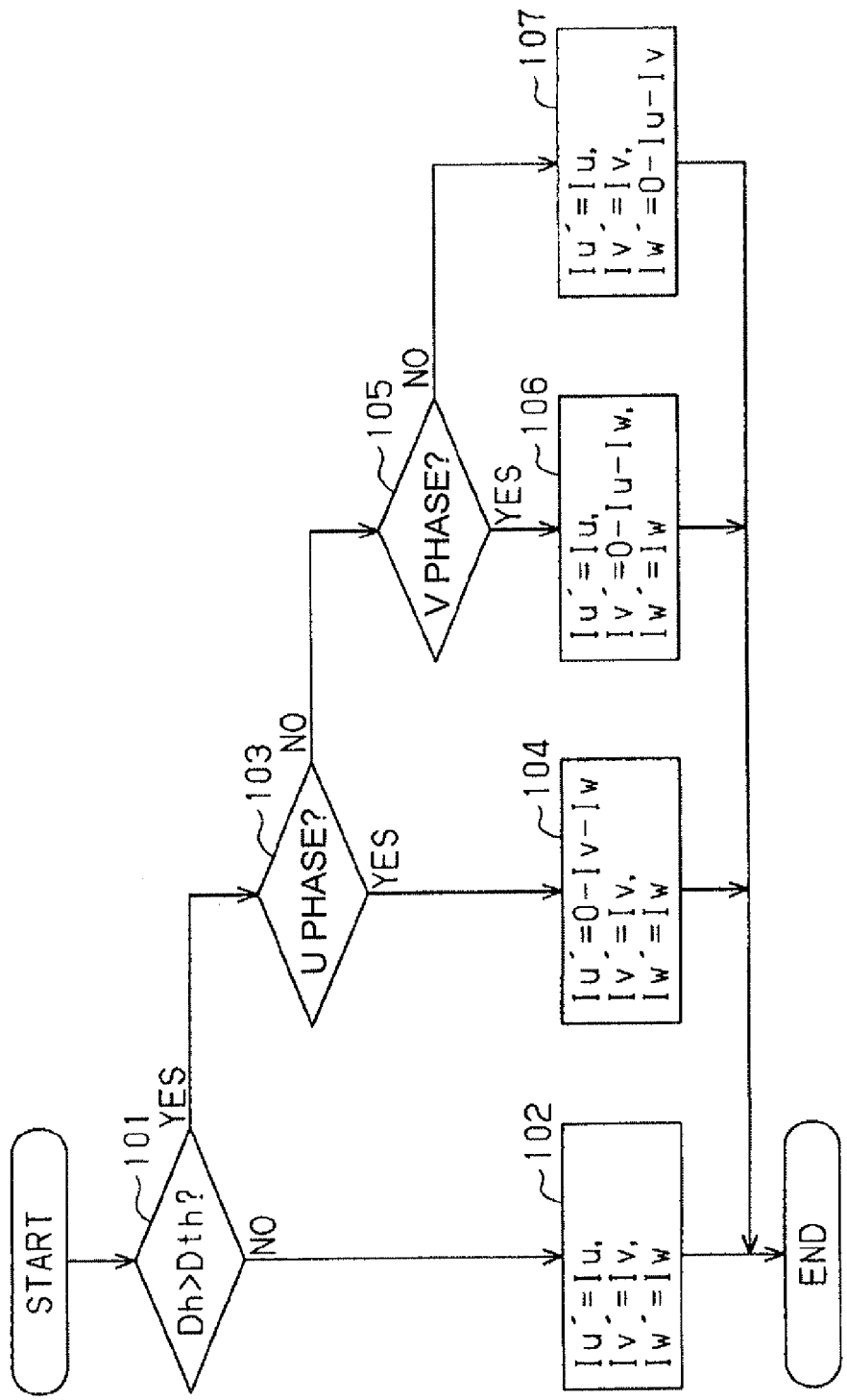
FIG. 5 is a flowchart that shows the procedure of blind correction.

More specifically, as shown in the flowchart of FIG. 5, the current selection processing unit 31 determines whether the duty command value Dh having the largest value among the input duty command values Du, Dv and Dw of the respective phases is larger than the threshold Dth (step 101). Then, when the duty command value Dh is smaller than or equal to the threshold Dth (Dh≤Dth, NO in step 101), the current values Iu, Iv and Iw of the respective phases, detected based on the signals output from the respective current sensors 21u, 21v and 21w, are output to the three phase/two phase converting unit 25 without performing blind correction (Iu'=Iu, Iv'=Iv, Iw'=Iw, step 102).

On the other hand, in step 101, when the duty command value Dh having the largest value is larger than the threshold Dth (Dh>Dth, YES in step 101), the current selection processing unit 31 first determines whether the duty command value Dh is the U-phase duty command value Du (step 103). Then, when the duty command value Dh is the U-phase duty command value Du (YES in step 103), that is, when the U phase is a current undetectable phase, blind correction by which the value of the U-phase phase current value Iu' is estimated based on the V-phase phase current value Iv and the W-phase phase current value Iw is executed.

The value of the U-phase phase current value Iu' in this case is obtained by subtracting the V-phase phase current value Iv and the W-phase phase current value Iw from "0". Then, the current selection processing unit 31 outputs the current values Iu', Iv' and Iw' of the respective phases, obtained by executing blind correction, to the three phase/two phase converting unit 25 (Iu'=0−Iv−Iw, Iv'=Iv, Iw'=Iw, step 104).

In step 103, when the duty command value Dh having the largest value is not the U-phase duty command value Du (NO in step 103), the current selection processing unit 31 subsequently determines whether the duty command value Dh is the V-phase duty command value Dv (step 105). Then, when the duty command value Dh is the V-phase duty command value Dv (YES in step 105), that is, when the V phase is a current undetectable phase, blind correction by which the value of the V-phase phase current value Iv' is estimated based on the U-phase phase current value Iu and the W-phase phase current value Iw is executed (step 106).

The value of the V-phase phase current value Iv' in this case is obtained by subtracting the U-phase phase current value Iu and the W-phase phase current value Iw from "0". Then, the current selection processing unit 31 outputs the current values Iu', Iv' and Iw' of the respective phases, obtained by executing blind correction, to the three phase/two phase converting unit 25 (Iu'=Iu, Iv'=0−Iu−Iw, Iw'=Iw, step 104).

In step 105, when the duty command value Dh having the largest value is not the V-phase duty command value Dv (NO in step 105), the current selection processing unit 31 determines that the W phase is a current undetectable phase. Then, blind correction by which the W-phase phase current value Iw' is estimated based on the U-phase phase current value Iu and the V-phase phase current value Iv is executed.

The value of the W-phase phase current value Iw' in this case is obtained by subtracting the U-phase phase current value Iu and the V-phase phase current value Iv from "0". Then, the current selection processing unit 31 outputs the current values Iu', Iv' and Iw' of the respective phases, obtained by executing blind correction, to the three phase/two phase converting unit 25 (Iu'=Iu, Iv'=Iv, Iw'=0−Iu−Iv, step 107).

By executing blind correction in this way, at the time of an increased duty command value Du, Dv or Dw as well, it is possible to obtain all the three-phase phase current values Iu', Iv' and Iw'. However, there still exists a problem in terms of accuracy in current detection using such blind correction as described above. That is, when the phase current values of the two phases other than the current undetectable phase are detected, the FETs that constitute the switching arm corresponding to the current undetectable phase is turned on or off and, therefore, noise is contained into the phase current values of the detected two phases.

In consideration of this point, at the time of executing current detection using the blind correction, the microcomputer 17 according to the present embodiment outputs motor control signals for maintaining the switching states of the switching arm corresponding to the current undetectable phase when the phase current values of the two phases, other than the current undetectable phase, based on which the blind correction is performed, are detected. Specifically, at the time of current detection using blind correction, motor control signals based on which the high potential side FET is kept ON and the low potential side FET is kept OFF in the switching arm corresponding to the current undetectable phase are output. Then, in the present embodiment, thus, high-accuracy current detection is ensured at the time of an increased duty command value Du, Dv or Dw as well.

More specifically, as shown in FIG. 3, the motor control signal output unit 24 includes the current detection compensation control unit 32, and the duty command values Du, Dv and Dw of the respective phases, generated by the PWM converting unit 29, are input in the current detection compensation control unit 32. Then, at the time of current detection using the blind correction, the current detection compensation control unit 32 outputs the duty command values Du', Dv' and Dw', which have been corrected so that the high potential side FET corresponding to the current undetectable phase is turned ON and the low potential side FET corresponding to the current undetectable phase is turned OFF, to the PWM output unit 30.

Figure 6:
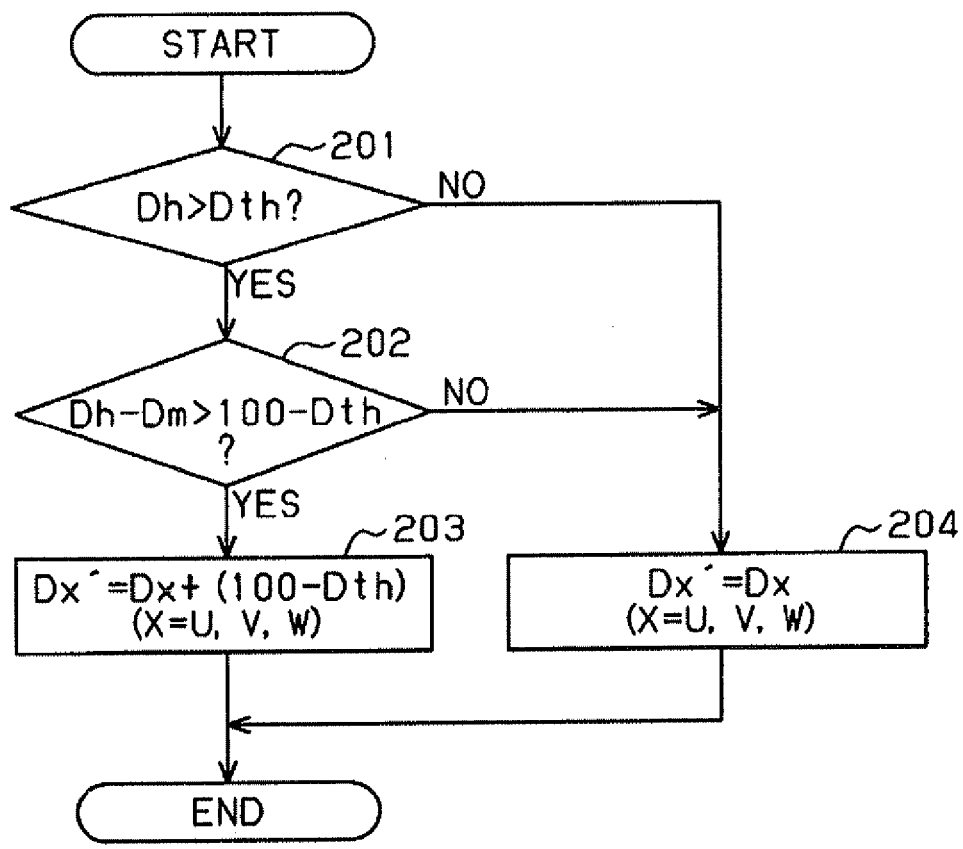
FIG. 6 is a flowchart that shows the procedure of current detection compensation control.

Furthermore, as shown in the flowchart of FIG. 6, the current detection compensation control unit 32 determines whether the duty command value Dh having the largest value among the duty command values Du, Dv and Dw of the respective phases, input from the PWM converting unit 29, is larger than the threshold Dth corresponding to the above described high limit value Dmax (step 201).

Here, when the duty command value Dh having the largest value is larger than the threshold Dth in step 201 (Dh>Dth, YES in step 201), that is, when it is determined that current detection using blind correction is executed due to occurrence of a current undetectable phase, the current detection compensation control unit 32 executes compatibility determination as to the current detection compensation control in the next step 202. More specifically, it is determined whether a value (Dh−Dm) that is obtained by subtracting a duty command value Dm that indicates a median value among the duty command values Du, Dv and Dw of the respective phases from the duty command value Dh having the largest value is larger than a value (100−Dth) that is obtained by subtracting the threshold Dth from "100" (step 202).

Subsequently, when it is determined in step 202 that the condition for executing the current detection compensation control is satisfied (Dh−Dm>100−Dth, YES in step 202), the current detection compensation control unit 32 executes current detection compensation control such that the high potential side FET corresponding to the current undetectable phase is turned ON and the low potential side FET corresponding to the current undetectable phase is turned OFF. Specifically, a value that is obtained by subtracting the duty command value Dh having the largest value from "100" is added to the duty command value Dx (X=U, V, W) of each phase (Dx'=Dx+(100−Dh), step 203).

On the other hand, when the duty command value Dh having the largest value is smaller than or equal to the threshold Dth in step 201 (Dh≤Dth, NO in step 201) or when it is determined that the condition for executing current detection compensation control is not satisfied in step 202 (Dh−Dm≤100−Dth, NO in step 202), the current detection compensation control unit 32 does not execute the process of step 203. Then, the duty command values Du, Dv and Dw of the respective phases, input from the PWM converting unit 29, are output to the PWM output unit 30 without any correction (Dx'=Dx, step 204).

Figure 4:
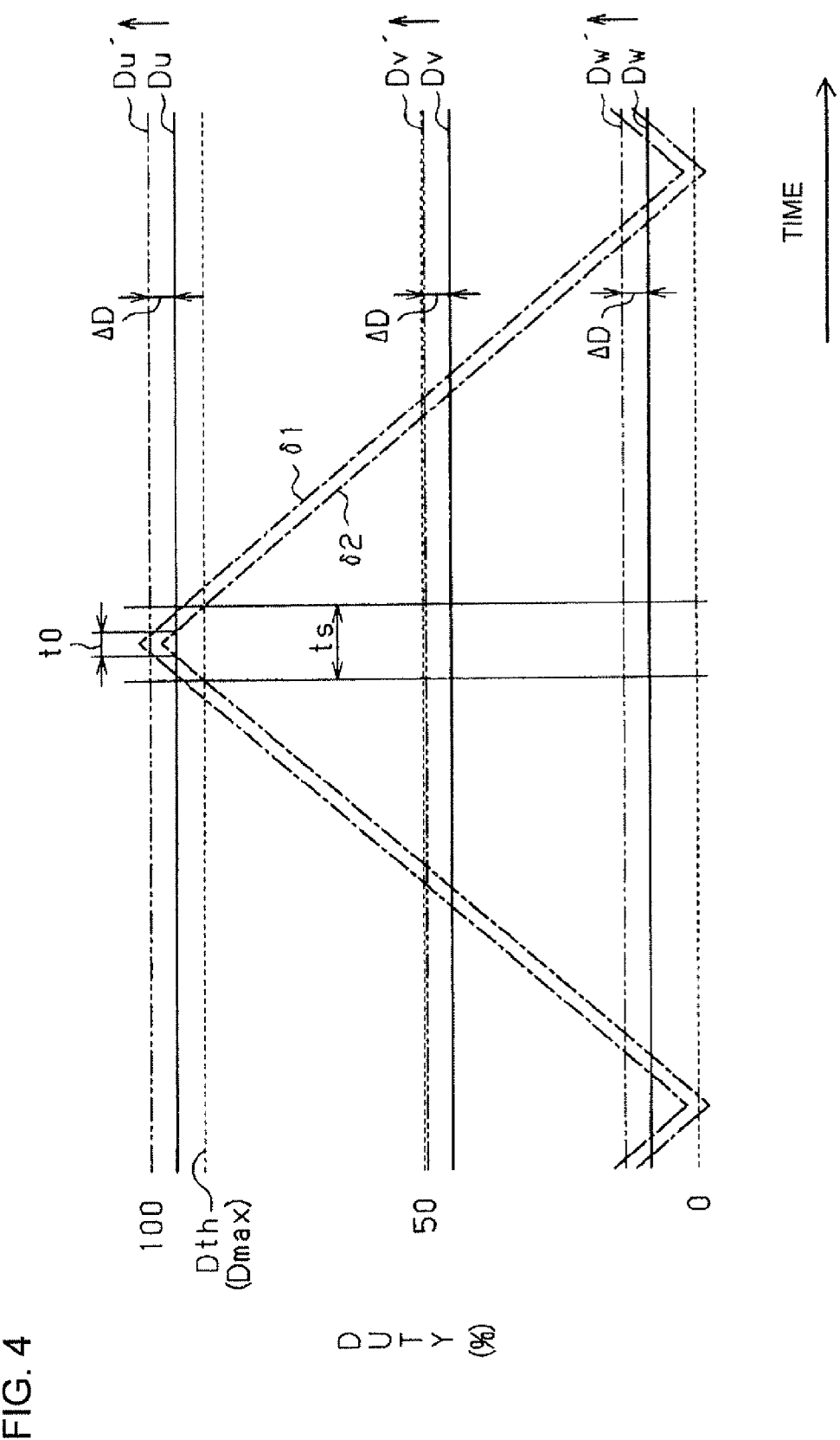
FIG. 4 is a view that illustrates a mode of current detection compensation control.

For example, in the example shown in FIG. 4, through computation of step 203, the U-phase duty command value Du that is the current undetectable phase is increased to "100" to thereby keep the switching arm 18u corresponding to the U phase in a state where the high potential side FET 18a is ON and the low potential side FET 18d is OFF. That is, at the time of current detection using blind correction, the FETs 18a and 18d corresponding to the current undetectable phase (U phase) are not turned on or off so that it is possible to prevent noise from being contained in the phase current values (Iv, Iw) detected in the two phases (V, W) other than the current undetectable phase.

A difference ΔD when the U-phase duty command value Du that is the current undetectable phase is increased to "100" is also added to each of the duty command values Dv and Dw of the remaining two phases (V and W phases) other than the current undetectable phase as described above. That is, all the duty command values Du, Dv and Dw are shifted to the high potential side so that the duty command value of the current undetectable phase becomes "100". Thus, influences on the line-to-line voltages of the respective phases due to maintaining the switching states of the switching arm corresponding to the current undetectable phase are offset.

Figure 7:
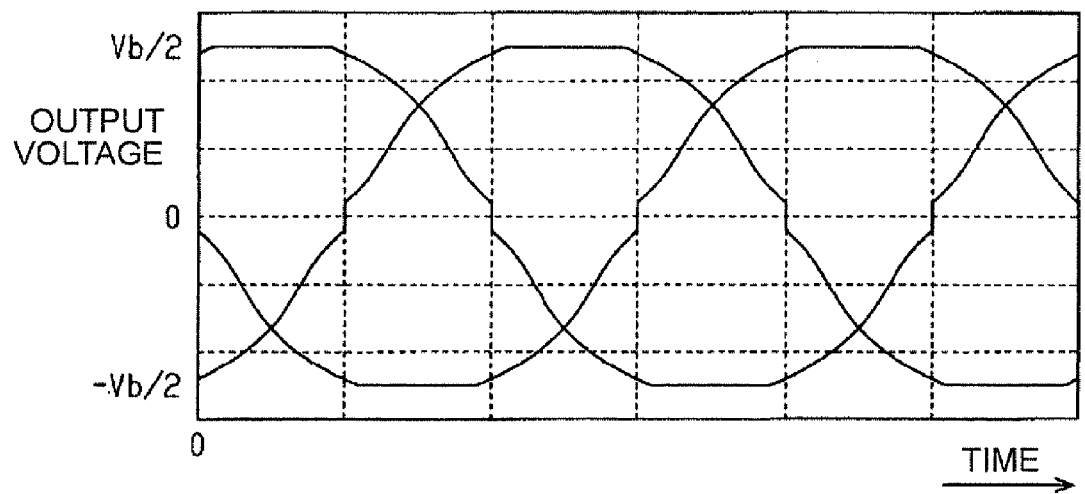
FIG. 7 is a graph that shows output voltage waveforms when current detection compensation control is not executed.
Figure 8:
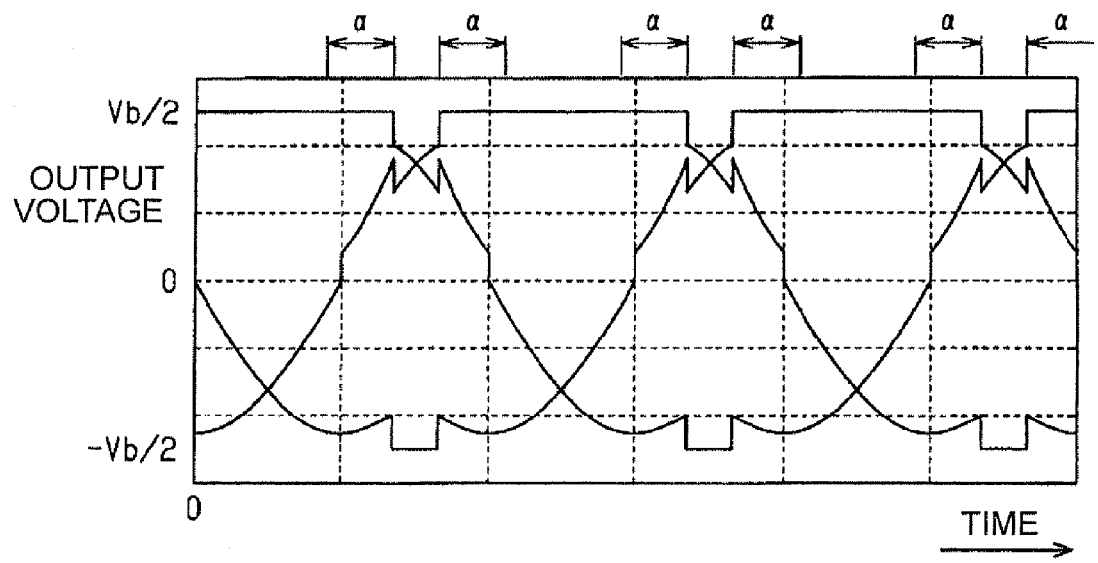
FIG. 8 is a graph that shows output voltage waveforms when current detection compensation control is executed.

Specifically, the microcomputer 17 is configured to attempt to improve the voltage utilization factor by outputting motor control signals such that the output voltage waveforms of the driving circuit 18 become known pseudo third harmonic superimposed sinusoidal waves as shown in FIG. 7. By applying current detection compensation control shown in step 203 to the motor control signals for forming such output voltage waveforms, the output voltage waveforms of the driving circuit 18 are shaped as shown in FIG. 8.

That is, by executing current detection compensation control by which a difference ΔD (see FIG. 4) for increasing all the duty command values Du, Dv and Dw is added thereto as described above in order to maintain the switching states of the switching arm corresponding to the current undetectable phase, the output voltages of the respective phases each are shifted toward a high potential side in an execution range α of the current detection compensation control. That is, as in the case of superimposition of pseudo third harmonics, the neutral point is shifted. Thus, the line-to-line voltage waveforms of the respective phases are constant irrespective of whether the current detection compensation control is executed. In the present embodiment, thus, high-accuracy current detection is possible without exerting an influence on smooth rotation of the motor 12.

As described above, according to the present embodiment, the following operations and effects may be obtained.

(1) When the ON time t0 of any one of the low potential side FETs 18d, 18e and 18f corresponding to the respective phases in the driving circuit 18 becomes shorter than the detection time ts of a phase current value, the microcomputer 17 estimates the phase current value of a current undetectable phase based on the phase current values of the two phases other than the current undetectable phase corresponding to that FET (blind correction). When current detection is performed using blind correction, at the time of current detection of the two phases, other than the current undetectable phase, based on which the blind correction is performed, motor control signals for maintaining the switching states of the switching arm corresponding to the current undetectable phase are output.

By employing the blind correction, even when there occurs a current undetectable phase for which current detection cannot be performed by the current sensors 21u, 21v and 21w provided at the low potential sides of the switching arms 18u, 18v and 18w that constitute the driving circuit 18, it is possible to detect the phase current values of all the three phases. Then, when the phase current values of the two phases other than the current undetectable phase are detected, the switching states of the switching arm corresponding to the current undetectable phase are maintained, that is, the high potential side FET is kept ON and the low potential side FET is kept OFF, to thereby make it possible to prevent noise that arises from the switching from being contained. With the above configuration, even when limitations on the duty command values Du, Dv and Dw for ensuring the detection times ts of the current values of the respective phases for all the three phases are removed, high-accuracy current detection may be ensured. As a result, it is possible to improve the voltage utilization factor using higher duty command values Du, Dv and Dw.

(2) The microcomputer 17 includes the current detection compensation control unit 32 that, at the time of current detection using blind correction, corrects the duty command values Du, Dv and Dw such that the high potential side FET corresponding to the current undetectable phase is turned ON and the low potential side FET corresponding to the current undetectable phase is turned OFF. At the time of current detection using blind correction, the current detection compensation control unit 32 shifts all the duty command values Du, Dv and Dw toward a high potential side such that the duty command value of the current undetectable phase becomes "100".

With the above configuration, in the execution range of the current detection compensation control, the output voltages of the respective phases each shift toward a high potential side. That is, by shifting the neutral point, the line-to-line voltage waveforms are constant irrespective of whether the current detection compensation control is executed. As a result, it is possible to achieve high-accuracy current detection without exerting an influence on smooth rotation of the motor.

Note that the above described embodiment may be modified as follows. In the above embodiment, the invention is implemented in the ECU 11, serving as the motor control device, which controls operation of the motor 12 that is the driving source of the EPS actuator 10. However, it is not limited to this, and may be applied to usage other than the EPS.

In the above embodiment, the microcomputer 17 outputs motor control signals such that the output voltage waveforms of the driving circuit 18 become pseudo third harmonic superimposed sinusoidal waves. However, sinusoidal wave conduction is not limited to such pseudo third harmonic superimposed sinusoidal wave conduction; instead, it may be normal sinusoidal wave conduction or may be regular third harmonic sinusoidal wave conduction.

In the present embodiment, determination as to occurrence of a current undetectable phase (see FIG. 5 and FIG. 6, steps 101 and 201) and current detection compensation control (see FIG. 6, step 203) for maintaining the switching states of the switching arm corresponding to the current undetectable phase are executed based on the duty command values Du, Dv and Dw computed in process of generating motor control signals. However, the invention is not limited to this. For example, determination as to occurrence of a current undetectable phase and current detection compensation control may be executed based on a comparison between the timing of current sampling executed at the predetermined interval and the ON/OFF timing of the switching arm of each phase. That is, when the timing at which any one of the high potential side FETs 18a, 18b and 18c that constitute the driving circuit 18 are turned off overlaps with the start timing (+margin) of current sampling, the switching states of the switching arm of that phase may be, for example, maintained.

REFERENCE SIGNS LIST

1 ELECTRIC POWER STEERING SYSTEM (EPS)
10 EPS ACTUATOR
11 ECU
12 MOTOR
12u, 12v, 12w MOTOR COIL
17 MICROCOMPUTER
18 DRIVING CIRCUIT
18a to 18f FET
18u, 18v, 18w SWITCHING ARM
20 IN-VEHICLE POWER SUPPLY
21u, 21v, 21w CURRENT SENSOR
23 CURRENT COMMAND VALUE COMPUTING UNIT
24 MOTOR CONTROL SIGNAL GENERATING UNIT
29 PWM CONVERTING UNIT
30 PWM OUTPUT UNIT
31 CURRENT SELECTION PROCESSING UNIT
32 CURRENT DETECTION COMPENSATION CONTROL UNIT
Iu, Iv, Iw PHASE CURRENT VALUE
Vu, Vv, Vw PHASE VOLTAGE COMMAND VALUE
Du, Dv, Dw, Dx, Dh, Dm DUTY COMMAND VALUE
Dmax HIGH LIMIT VALUE
Dth THRESHOLD
ΔD DIFFERENCE
δ1, δ2 TRIANGULAR WAVE
t0 ON TIME
ts DETECTION TIME
td DEAD TIME
α EXECUTION RANGE

The invention claimed is:
1. A motor control device, comprising:
a control signal output device that generates and outputs motor control signals; and
a driving circuit that outputs three-phase driving electric power based on the motor control signals, wherein
the driving circuit is formed by connecting switching arms, the switching arms formed by serially connecting pairs of switching elements that are turned ON or OFF based on the motor control signals, in correspondence with respective phases, in parallel with one another,
each of the switching arms respectively have current sensors that detect phase current values of the respective phases corresponding to the switching arms at low potential sides thereof,
the control signal output device generates the motor control signals based on phase current values of the respective phases, detected at a time at which all low potential side switching elements of the respective switching arms are turned ON, when an ON time of any one of the low potential side switching elements is shorter than the detection time, the control signal output device estimates a phase current value of a currently undetectable phase based on the phase current values of the respective phases, each of the respective phases are phases other than the currently undetectable phase, and at the time of detection of the respective phases, motor control signals corresponding to the currently undetectable phase are output, and the motor control signals corresponding to the currently undetectable phase are motor control signals that cause the driving circuit to: (i) keep ON a high potential side switching element of the pair of switching elements and (ii) keep OFF a low potential side switching element of the pair of switching elements.

2. The motor control device according to claim 1, wherein the control signal output device executes current feedback control based on detected phase current values of the respective phases to thereby compute voltage command values of the respective phases, the control signal output device generates the motor control signals based on a comparison between duty command values corresponding to the respective voltage command values and a triangular wave, and the motor control signals for maintaining switching states of the switching arm corresponding to the currently undetectable phase are output by shifting the duty command values of the respective phases toward a high potential side such that the duty command value of the current undetectable phase becomes a value at which the high potential side switching element corresponding to the current undetectable phase is kept ON.

3. The motor control device according to claim 1, wherein the control signal output device generates the motor control signals in order to perform pseudo third harmonic superimposed sinusoidal wave conduction.

4. The motor control device according to claim 2, wherein the control signal output device generates the motor control signals in order to perform pseudo third harmonic superimposed sinusoidal wave conduction.

5. The motor control device according to claim 1, wherein the control signal output device generates the motor control signals in order to perform sinusoidal wave conduction.

6. The motor control device according to claim 2, wherein the control signal output device generates the motor control signals in order to perform sinusoidal wave conduction.

7. A method of providing motor control signals, comprising:

detecting, by each current sensor of a plurality of switching arms of a driving circuit, phase current values of respective phases corresponding to the switching arms at low potential sides thereof;

generating, by a control signal output device, motor control signals based on phase current values of the respective phases, detected at a time at which all low potential side switching elements of the switching arms are turned ON;

when an ON time of any one of low potential side switching elements of the switching arms is shorter than the detection time, estimating, by the control signal output device, a phase current value of a currently undetectable phase based on the phase current values of the respective phases, each of the respective phases are phases other than the currently undetectable phase; and outputting, by the control signal output device at the time of detection of the respective phases, motor control signals corresponding to the currently undetectable phase;

wherein the motor control signals corresponding to the currently undetectable phase are motor control signals that cause the driving circuit to: (i) keep ON a high potential side switching element of the pair of switching elements and (ii) keep OFF a low potential side switching element of the pair of switching elements.

* * * * *